United States Patent [19]

Shinonaga et al.

[11] Patent Number: 5,462,987
[45] Date of Patent: Oct. 31, 1995

[54] POLYPROPYLENE RESIN COMPOSITION HAVING AN IMPROVED COMPATIBILITY WITH PAINT-COATINGS AND A PAINT-COATED ARTICLE THEREOF

[75] Inventors: Hideo Shinonaga, Chiba; Satoru Sogabe, Sodegaura, both of Japan

[73] Assignee: Sumitomo Chemical Company, Limited, Osaka, Japan

[21] Appl. No.: 161,274

[22] Filed: Dec. 3, 1993

[30] Foreign Application Priority Data

Dec. 8, 1992 [JP] Japan .................................. 4-327733
Sep. 13, 1993 [JP] Japan .................................. 5-227491

[51] Int. Cl.⁶ .............................. C08L 53/00; C08K 3/00
[52] U.S. Cl. ..................... 524/451; 524/406; 524/423; 524/418; 524/427; 524/431; 524/436; 524/437; 524/442; 524/445; 524/447; 524/448; 524/449; 524/452; 524/504; 524/505; 525/79; 525/71; 525/88
[58] Field of Search ..................... 525/79, 71, 88; 524/504, 505, 451

[56] References Cited

U.S. PATENT DOCUMENTS

| | | |
|---|---|---|
| 4,146,590 | 3/1979 | Yamamoto et al. ................ 260/878 |
| 4,735,988 | 4/1988 | Takada et al. ..................... 524/504 |
| 4,863,995 | 9/1989 | Murakami et al. . | |
| 4,957,968 | 9/1990 | Adur et al. . | |
| 5,331,046 | 7/1994 | Chang et al. . | |

FOREIGN PATENT DOCUMENTS

| | | |
|---|---|---|
| 0336780 | 10/1989 | European Pat. Off. ...... C08F 255/00 |
| 0429236 | 5/1991 | European Pat. Off. . |
| 2275487 | 1/1976 | France . |
| 62-257945 | 11/1987 | Japan . |

*Primary Examiner*—Carman J. Seccuro, Jr.
*Attorney, Agent, or Firm*—Sughrue, Mion, Zinn, Macpeak & Seas

[57] ABSTRACT

A polypropylene composition containing:
(A) 10–95 parts by weight of a crystalline polypropylene,
(B) 5–90 parts by weight of an ethylene-propylene copolymer rubber,
(C) 1–30 parts by weight, per 100 parts by weight of the mixture of said crystalline polypropylene and ethylene-propylene copolymer rubber, of a hydroxyl group-containing propylene oligomer, and optionally an inorganic filler in an amount of up to 40 parts by weight per 100 parts by weight of the mixture of said crystalline polypropylene and ethylene-propylene copolymer rubber and a suitable amount of an additive or auxiliary, has an improved compatibility with paint-coatings, and the shaped article formed from said composition can easily be paint-coated by simply treating it with water or an organic solvent instead of laying a primer layer onto the article before applying a paint thereon.

4 Claims, No Drawings

5,462,987

POLYPROPYLENE RESIN COMPOSITION HAVING AN IMPROVED COMPATIBILITY WITH PAINT-COATINGS AND A PAINT-COATED ARTICLE THEREOF

FIELD OF THE INVENTION

The present invention relates to a polypropylene resin composition having an improved compatibility with paint-coatings, and to a paint-coated article thereof. It further relates to a process for producing a paint-coated article of polypropylene composition which is useful and suited especially for automotive exterior parts such as bumpers.

BACKGROUND OF THE INVENTION

Polypropylene compositions have been known to be difficult to print, bind and paint due to their nonpolarity. Therefore, there have been proposed improved methods for providing stable paint-coatings on the molded articles of polypropylene compositions. For example, so-called primers or under-coatings are usually applied as a medium layer between the polypropylene compositions and the paints to improve their compatibility. This method is, however, still unsatisfactory from the industrial point of view because a primer itself is expensive, an additional step required to apply a primer increases the costs of the final products, and a primer poses an environmental problem associated with its waste treatment. Furthermore, the application of a primer is usually preceded by cleaning with vapors of halogenated hydrocarbons such as 1,1,1-trichloroethane. But, the use of 1,1,1-trichloroethane is now being banned in consideration of the ozone layer depletion and the protection of the global environment.

The surface treatments of molded articles of polypropylene compositions are another means to increase the binding strength of paints, prints or adhesives to them. For example, sandblasting, chromic acid treatment, flame treatment, corona discharge treatment, plasma treatment, surface activation with functional groups, and photo-induced surface grafting are applied before applying paints to the articles. However, none of them is satisfactory from the standpoint of performance and environmental problems.

Under the circumstances, the present inventors conducted research, which led to the finding that the compatibility and binding property of polypropylene compositions are greatly improved when crystalline polypropylene and an ethylene-propylene copolymer rubber are blended with a hydroxyl group-containing propylene oligomer. More specifically, it has been found that a polypropylene resin composition which comprises crystalline polypropylene, an ethylene-propylene copolymer rubber, a hydroxyl group-containing propylene oligomer, and optionally an inorganic filler has an advantageous and unique property in that it can easily and stably be paint-coated without pre-cleaning with vapors of 1,1,1-trichloroethane and a primer, but simply treating it with water or non-hologenated solvents such as alcohols, aromatic hydrocarbons or ketone-solvents before applying paints.

SUMMARY OF THE INVENTION

Accordingly, an object of the present invention is to provide a polypropylene composition which comprises:
(A) 10–95 parts by weight of a crystalline polypropylene,
(B) 5–90 parts by weight of an ethylene-propylene copolymer rubber and
(C) 1–30 parts by weight, per 100 parts by weight of the mixture of said crystalline polypropylene and ethylene-propylene copolymer rubber, of a hydroxyl group-containing propylene oligomer, and
(D) optionally up to 40 parts by weight, per 100 parts by weight of the mixture of said crystalline polypropylene and ethylene-propylene copolymer rubber, of an inorganic filler.

The polypropylene composition may be molded into various automotive exterior parts and easily and stably paint-coated without pre-cleaning with vapor of 1,1,1-trichloroethane and laying a primer layer.

Another object is to provide a paint-coated molded article of said polypropylene composition which may be obtained by treating the surface of a molded article of said polypropylene composition with water or a solvent and applying paint thereon.

A further object is to provide a process for producing a paint-coated shaped article of said polypropylene composition such as automotive exterior parts which process comprises treating said molded article with water or a solvent and then applying paint thereon.

PREFERRED EMBODIMENTS OF THE INVENTION

The polypropylene composition of the present invention comprises:
(A) a crystalline polypropylene in an amount of 10–95 parts by weight,
(B) an ethylene-propylene copolymer rubber in an amount of 5–90 parts by weight and
(C) a hydroxyl group-containing propylene oligomer in an amount of 1–30 parts by weight per 100 parts by weight of the mixture of said crystalline polypropylene and ethylene-propylene copolymer rubber.

In addition to the above-mentioned components (A) to (C), the composition may optionally contain an inorganic filler in amount of not more than 40 parts by weight per 100 parts by weight of the mixture of said crystalline polypropylene and ethylene-propylene copolymer rubber.

Further, suitable amounts of conventional additives or auxiliaries may be added to the composition before or during the molding of the composition into shaped articles such as automotive parts.

Crystalline Polypropylene

As the crystalline polypropylene, the following polymers are preferable and may be used alone or in combination:
(a) a homopolypropylene having a melt index of 10–100 g/10 min;
(b) a propylene-α-olefin random copolymer having a melt index of 10–100 g/10 min and containing 0.5–8 wt % of ethylene or $C_{4-6}$ α-olefin;
(c) a propylene-ethylene block copolymer containing ethylene-propylene random copolymer units and crystalline polypropylene homopolymer units, wherein the amount of said ethylene-propylene random copolymer units is 5 to 20% by weight relative to the total weight of the propylene-ethylene block copolymer, the ethylene content of the ethylene-propylene random copolymer units is 20 to 60% by weight, and the crystalline polypropylene homopolymer units have an intrinsic viscosity [η] measured with tetralin solution at 135° C. of 0.8 to 2.0 dl/g, a Q value, weight average molecular weight/number average molecular weight, measured by GPC of 3.0 to 5.0 and a content of xylene-soluble portion at 20° C. of not more than 1.5% by weight.

As for the homopolypropylene (a), the one which has a melt index of 10–100 g/10 min is preferable because of the good appearance and impact strength of the resulting molded articles. Molded articles with inferior appearance (e.g., flow marks, gloss) are sometimes obtained when the melt index of the used homopolypropylene is less than 10 g/10 min, and when the melt index of used homopolypropylene is higher than 100 g/10 min, the resulting molded articles sometimes suffer from poor physical properties, especially low impact strength.

The propylene-α-olefin random copolymer (b) used in the invention includes a copolymer formed by copolymerization of propylene with and α-olefin such as ethylene, butene-1, hexene-1 and 4-methyl-pentene-1. The most desirable α-olefin is ethylene. Among these, those containing 0.5–8 wt % of α-olefin are preferable. With an α-olefin content higher than 8 wt %, the resulting molded article tends to be poor in physical properties, especially in heat resistance.

The preferred propylene-α-olefin random copolymer is the one which has a melt index of 10–100 g/10 min, for the same reason as in the case of the homopolypropylene.

As the propylene-ethylene block copolymer (c), preferred copolymers are those containing ethylene-propylene random copolymer units and crystalline polypropylene homopolymer units, wherein the amount of said ethylene-propylene random copolymer units is 5 to 20%, preferable 7 to 15% by weight relative to the total weight of the propylene-ethylene block copolymer, the ethylene content of the ethylene-propylene random copolymer units is 20 to 60%, preferably 20 to 50% by weight, and the crystalline polypropylene homopolymer units have an intrinsic viscosity [η] measured with tetralin solution at 135° C. of 0.8 to 2.0 dl/g, a Q value, weight average molecular weight/number average molecular weight, measured by GPC of 3.0 to 5.0 and a content of xylene-soluble portion at 20° C. of not more than 1.5, preferably not more than 1.2% by weight.

The above-mentioned homopolypropylene (a), propylene-α-olefin random copolymer (b), and propylene-ethylene block copolymer (c) can be obtained by conventional methods, for example, by reacting the relevant monomers in the presence of a Ziegler-Natta catalyst, which is composed of titanium trichloride and alkyl aluminum compound.

As the crystalline polypropylene, a modified polypropylene or a mixture of a modified polypropylene and the above-mentioned crystalline polypropylene may also be used.

Said modified polypropylene can be obtained by grafting the above-mentioned crystalline polypropylene with an unsaturated carboxylic acid or the anhydride thereof in an amount of 0.05–20 wt %, preferably 0.1–10 wt % based on the weight of the crystalline polypropylene. Examples of the graft monomer to be used in said modification include acrylic acid, methacrylic acid, maleic acid, itaconic acid, maleic anhydride and itaconic anhydride. Of these, maleic anhydride is especially preferable.

The grafting of the polypropylene may be accomplished by known processes. For example, the modified polypropylene may be produced by melt-kneading said crystalline polypropylene, the graft monomer and a radical initiator with an extruder. It may also be produced by heating the solution of said crystalline polypropylene in an organic solvent such as xylene together with a radical generator in an atmosphere of nitrogen with stirring, then cooling the reaction system, and filtering, washing, and drying the reaction product. It may also be produced by irradiating ultraviolet rays to said crystalline polypropylene in the presence of the graft monomer, or contacting oxygen or ozone to said crystalline polypropylene in the presence of the graft monomer.

Ethylene-propylene Copolymer rubber (B)

The ethylene-propylene copolymer rubber (B) used in the present invention includes ethylene-propylene random copolymer rubber which contains 10–70 wt % of propylene and which has a Mooney viscosity ($ML_{1+4}$ 100° C.) of 10–100. With a propylene content outside the above-specified range, the resulting molded article is sometimes poor in impact strength.

The ethylene-propylene random copolymer rubber can be produced by conventional methods, for example, by polymerizing the comonomers in the presence of a catalyst composed of vanadium compound and an organoaluminum in a hydrocarbon solvent (e.g., hexane, heptane). As the vanadium compound, vanadium oxytrichloride, vadadium tetrachloride or vanadates, and as the organoaluminum, ethylaluminium sesquichloride or diethylaluminium chloride may be used.

As said ethylene-propylene random copolymer rubber, ethylene-propylene-nonconjugated diene copolymer rubbers may be used, and as the non-conjugated diene, dicyclopentadiene, 1,4-hexadiene, dicyclooctadiene, methylene-norbornene, 5-ethylidene-2norbornane are preferably used.

With a Mooney viscosity lower than 10, the resulting molded article tends to be poor in mechanical properties. With a Mooney viscosity higher than 100, the compound tends to be poor in flowability at the time of molding and hence the resulting molded article is sometimes poor in appearance.

Hydroxyl group-containing Propylene Oligomer (C)

The term "hydroxyl group-containing propylene oligomer (C)" used in the present invention refers to an oligomer which comprises polypropylene having hydroxyl groups. An example of the oligomer is a low molecular weight polypropylene of the same type as the above-mentioned crystalline polypropylene (A) to which hydroxyl-containing groups have been grafted. Such hydroxyl group-containing propylene oligomer may be prepared by the known methods (e.g., JP-A-61-113675, JP-A-50-160394 and JP-A-56-88403. A preferred hydroxyl group-containing propylene oligomer is the one which has a number-average molecular weight (Mn) of 2,000–20,000 and having a hydroxyl value of 10–60. Such hydroxyl group-containing propylene oligomers are commercially available, for example, from Sanyo Chemical Industries, Ltd. under a trade name of Youmex 1201H (Y1201H) or Youmex 1210 (Y1210).

Inorganic filler (D)

The inorganic filler (D) used in the present invention includes talc, mica, wollastonite, calcium carbonate, barium sulfate, magnesium carbonate, clay, alumina, silica, calcium sulfate, carbon fiber, glass fiber, metal fiber, silica sand, silicastone, carbon black, titanium oxide, magnesium hydroxide, asbestos, zeolite, molybdenum, diatomaceous earth, sericite, Shirasu, calcium hydroxide, potassium sulfite, sodium sulfate, bentonite, and graphite.

Of these inorganic filler, talc with an average particle diameter not larger than 3 μm is desirable in view of its improving effects on the stiffness, impact strength at a low-temperature and appearance of the molded articles.

The Amounts of the Components

When the amount of the ethylene-propylene copolymer rubber is less than 5 parts by weight per 100 parts by weight of the mixture of the crystalline polypropylene (A) and ethylene-propylene copolymer rubber (B), the impact resistance of the molded articles is sometimes not so much improved. When the amount of the ethylene-propylene copolymer rubber is more than 90 parts by weight in 100 parts by weight of the mixture of the crystalline polypropylene (A) and ethylene-propylene copolymer rubber (B), the stiffness and heat resistance of the molded articles are sometimes reduced. Preferred range of the amount of the ethylene-propylene copolymer rubber is 5 to 40 parts by weight.

When the amount of the hydroxyl group-containing propylene oligomer (C) is less than 1 part by weight in 100 parts by weight of the mixture of the crystalline polypropylene (A) and ethylene-propylene copolymer rubber (B), the paintability, printability and binding strength of the molded articles sometimes are not improved to a sufficient extent. When the amount exceeds 30 parts by weight per 100 parts by weight of the mixture of the crystalline polypropylene (A) and ethylene-propylene copolymer rubber (B), the hydroxyl group-containing propylene oligomer (C) sometimes causes the decrease of the stiffness and heat resistance of the molded articles. Preferred range of the amount of the hydroxyl group-containing propylene oligomer is 1 to 15 parts by weight.

When the amount of the inorganic filler exceeds 40 parts by weight of the mixture of the crystalline polypropylene (A) and ethylene-propylene copolymer rubber (B), the impact strength of the molded articles is sometimes reduced. Preferred range of the amount of the inorganic filler is 2 to 30 parts.

Molding and Painting

The polypropylene resin composition of the present invention may be prepared by known methods usually used in the art. For example, solutions of the above-mentioned components are mixed together and then the solvents are evaporated off from the resulting mixture or alternatively, the composition is precipitated by adding a poor solvent to the resulting mixture. However, melt-kneading is preferable from the industrial point of view. Melt-kneading may be accomplished with a Banbury mixer, extruder, roll, or kneader.

It is preferable that the melt-kneading of the components is preceded by uniform mixing of each of the components, which may be either powder or pellets, with a tumbler or Henschel mixer. However, this preliminary mixing step may be omitted, and each of the components may directly be fed to a kneading apparatus.

The thus kneaded composition is then molded by injection molding, extrusion molding and the like. Instead of kneading the components, they may be dry-blended and then mixed during the melting step in the injection molding or extrusion molding to form shaped articles.

During the kneading step, suitable amounts of conventional additives or auxiliaries may be added to the composition. They include, for example, an antioxidant, UV light absorber, slip agent, pigment, antistatic agent, copper deactivator, flame retardant, neutralizing agent, foaming agent, plasticizer, and nucleating agent.

One of the striking advantages of the articles molded out of the crystalline polypropylene composition of the present invention is that once the surface of the articles is treated with water or a non-halogenated organic solvent, the articles can be painted by a paint with high compatibility. Thus, the articles do not need application of any primer onto the surface nor precleaning of the surface beforehand. The non-halogenated organic solvent has a boiling point of, with increasing preference, 150° C. or lower and 100° C. or lower.

This surface treatment may be accomplished by applying, wiping or spraying water or said organic solvents on the surface of the molded articles or alternatively, dipping them in water or said organic solvents.

Being innoxious and incombustible, water is advantageous over other solvents from the standpoint of safety and prevention of environmental pollution.

In the present invention, there in no particular restriction with respect to the water to be used, but pure water, tap water and industrial water may be used. As the water used in the present invention, acidic or basic aqueous solutions may also be used.

Examples of the non-halogenated organic solvents having a boiling point not higher than 150° C. include alcohols (e.g., ethanol and isopropyl alcohol), aliphatic hydrocarbons (e.g., hexane, heptane, and cyclohexane), aromatic hydrocarbons (e.g., toluene), ketones (e.g., acetone and methyl ethyl ketone), esters (e.g., ethyl acetate), petroleum benzine, and kerosene.

Of these solvents, water, isopropyl alcohol, and cyclohexane are preferable. Halogenated organic solvents are undesirable due to their effects on ozone depletion or the global environmental problems.

The solvent having a boiling point higher than 150° C. is not preferable because they cannot be rapidly evaporated after the solvent-treatment has been finished.

After the molded articles have been treated with water or the solvents, they are dried, for example, by air-drying, and then coated with a melamine paint, urethane paint or acrylic paint. The melamine paint and urethane paint are preferable. The preferable melamine paint is of curable type, including a polyester melamine paint of flexible type, which is commonly used for bumpers.

The urethane paint includes an acryl urethane paint, a polyester urethane paint, and a urethane paint in the form of a single solution.

Although the molded articles of the present invention can well be painted without a primer layer as mentioned above, it can also be well painted in the conventional manner in which a primer is applied before applying paints. However, the composition of the present invention can well be painted without precleaning with said hologanated hydrocarbons such as 1,1,1-trichloroethane before applying a primer.

After the paints have been applied, the molded articles are usually baked at 60° C. to 150° C. for 20 minutes to 1 hour.

The invention will be described in more detail with reference to the following examples, which are not intended to restrict the scope of the invention.

EXAMPLE 1

A mixture of 60 parts by weight of propylene-ethylene block copolymer having a melt index of 30 g/10 min and an ethylene content of 3.2 wt % and containing propylene-ethylene copolymer units having an ethylene content of 24.7 wt % and an intrinsic viscosity of 6.4 dl/g measured with tetralin solution at 135° C., and 40 parts by weight of an ethylene-propylene random copolymer rubber having a propylene content of 45 wt % and a Mooney viscosity (ML$_{1+4}$ 100° C.) of 30 were melt-kneaded at 180° C. for 8 minutes with a 16-liter Banbury mixer. The resulting mixture was rolled and cut into pellets by a sheet cutter to obtain a master batch (hereinafter MB) in pellet form.

To the master batch was added the same propylene-ethylene block copolymer to produce the composition comprising 46 parts by weight of the propylene-ethylene block copolymer and 29 parts by weight of the ethylene-propylene random copolymer rubber. The mixture was further mixed with 5 parts by weight of a hydroxyl group-containing propylene oligomer having a molecular weight of 12,000 and a hydroxyl value of 21.5 (Youmex 1201H manufactured by Sanyo Chemical Industries, Ltd.) and 20 parts by weight of talc having an average particle diameter of 2.5 μm. They were uniformly mixed with a Henschel mixer and then melt-mixed at 220° C. with a continuous twin-screw mixer (TEX 44SS 30BW-2V, made by Japan Steel Works, Ltd.) to give pellets. The resulting pellets were injection-molded into flat plates (100×400×3 mm thick) at 220° C. with an injection molder, "Neomat 515/150" made by Sumitomo Heavy Industries, Ltd. The resulting plates were subjected to the evaluations.

From the plates were cut out 100 mm square of specimen, the surface of which was treated with cyclohexane (by wiping with gauze) and air-dried. The specimen was then coated by spraying with one-solution type urethane paint (Flexthane 101 manufactured by Nippon Bee Chemical Co., Ltd.) and baked at 120° C. for 40 minutes. The coated specimen was tested for the initial adhesion as described below. The results are shown in Table 2.

Evaluation of Coatability (Initial adhesion)

In the Examples and Comparative examples, the initial adhesion of paint-coating formed on a composition was evaluated in the following manner unless otherwise is indicated:

A checker board pattern containing 100 squares (each 2 mm by 2 mm) was made on the paint-coating layer of the specimen by cutting with a razor blade. A piece of plastic adhesive tape (24 mm wide, cellophane tape manufactured by Nichiban Co., Ltd.) was applied over the squares and rapidly pulled off. By counting the number of squares remaining on the specimen, the initial adhesion of the paint-coating was evaluated.

COMPARATIVE EXAMPLE 1

The same procedure as in Example 1 was repeated except that the surface treatment with cyclohexane was not performed. The results are shown in Table 2.

COMPARATIVE EXAMPLE 2

The same procedure as in Example 1 was repeated except that the amount of propylene-ethylene block copolymer was changed to 51 parts by weight and the hydroxyl group-containing propylene oligomer was not used. The results are shown in Table 2.

EXAMPLE 2

The same procedure as in Example 1 was repeated except that the amount of propylene-ethylene block copolymer was changed to 41 parts by weight and the amount of hydroxyl group-containing propylene oligomer was changed to 10 parts by weight. The results are shown in Table 2.

EXAMPLE 3

The same procedure as in Example 1 was repeated except that the amount of propylene-ethylene block copolymer was changed to 41 parts by weight, the amount of ethylene-propylene random copolymer rubber was changed to 34 parts by weight, the amount of hydroxyl group-containing propylene oligomer was changed to 5 parts by weight, and the amount of talc was changed to 20 parts by weight. The results are shown in Table 2.

COMPARATIVE EXAMPLE 3

The same procedure as in Example 3 was repeated except that the surface treatment with cyclohexane was not performed. The results are shown in Table 2.

COMPARATIVE EXAMPLE 4

The same procedure as in Example 3 was repeated except that the amount of propylene-ethylene block copolymer was changed to 46 parts by weight and the hydroxyl group-containing propylene oligomer was not used. The results are shown in Table 2.

EXAMPLE 4

The same procedure as in Example 1 was repeated except that the amount of propylene-ethylene block copolymer was changed to 51 parts by weight and the amount of ethylene-propylene random copolymer rubber was changed to 24 parts by weight. The results are shown in Table 2.

COMPARATIVE EXAMPLE 5

The same procedure as in Example 4 was repeated except that the surface treatment with cyclohexane was not performed. The results are shown in Table 2.

COMPARATIVE EXAMPLE 6

The same procedure as in Example 4 was repeated except that the amount of propylene-ethylene block copolymer was changed to 56 parts by weight and the hydroxyl group-containing propylene oligomer was not used. The results are shown in Table 2.

EXAMPLE 5

The same procedure as in Example 1 was repeated except that the amount of propylene-ethylene block copolymer was changed to 66 parts by weight and talc was not used. The results are shown in Table 2.

COMPARATIVE EXAMPLE 7

The same procedure as in Example 5 was repeated except that the surface treatment with cyclohexane was not performed. The results are shown in Table 2.

COMPARATIVE EXAMPLE 8

The same procedure as in Example 5 was repeated except that the amount of propylene-ethylene block copolymer was changed to 71 parts by weight and the hydroxyl group-containing propylene oligomer was not used. The results are shown in Table 2.

TABLE 1

Components and the amounts

| Example No. | Components (weight parts) | | | |
|---|---|---|---|---|
| | A | B | C | D |
| Example 1 | 46 | 29 | 5 | 20 |
| Comparative Example 1 | 46 | 29 | 5 | 20 |
| Comparative Example 2 | 51 | 29 | — | 20 |
| Example 2 | 41 | 29 | 10 | 20 |
| Example 3 | 41 | 34 | 5 | 20 |
| Comparative Example 3 | 41 | 34 | 5 | 20 |
| Comparative Example 4 | 46 | 34 | — | 20 |
| Example 4 | 51 | 24 | 5 | 20 |
| Comparative Example 5 | 51 | 24 | 5 | 20 |
| Comparative Example 6 | 56 | 24 | — | 20 |
| Example 5 | 66 | 29 | 5 | — |
| Comparative Example 7 | 66 | 29 | 5 | — |
| Comparative Example 8 | 71 | 29 | — | — |

(A): Propylene-ethylene block copolymer
(B): Ethylene-propylene random copolymer rubber
(C): Hydroxyl group-containing propylene oligomer
(D): Talc

TABLE 2

Evaluation of Initial Adhesion

| Example No. | Cyclohexane | Paint | Initial Adhesion (%) |
|---|---|---|---|
| Example 1 | yes | Flexthane 101 | 79 |
| Comparative Example 1 | no | Flexthane 101 | 0 |
| Comparative Example 2 | yes | Flexthane 101 | 0 |
| Example 2 | yes | Flexthane 101 | 87 |
| Example 3 | yes | Flexthane 101 | 96 |
| Comparative Example 3 | no | Flexthane 101 | 0 |
| Comparative Example 4 | yes | Flexthane 101 | 0 |
| Example 4 | yes | Flexthane 101 | 56 |
| Comparative Example 5 | no | Flexthane 101 | 0 |
| Comparative Example 6 | yes | Flexthane 101 | 0 |
| Example 5 | yes | Flexthane 101 | 75 |
| Comparative Example 7 | no | Flexthane 101 | 0 |
| Comparative Example 8 | yes | Flexthane 101 | 0 |

EXAMPLE 6

The following components were uniformly mixed using a Henschel mixer.
48 parts by weight of the same propylene-ethylene block copolymer as used in Example 1
25 parts by weight of ethylene-propylene random copolymer rubber containing 27 wt % propylene and having a Mooney viscosity ($ML_{1+4}$ 100° C.) of 45
7 pats by weight of the hydroxyl group-containing propylene oligomer having a molecular weight of 4000 and a hydroxyl value of 50 (Youmex 1210 from Sanyo Chemical Industries, Ltd.)
20 parts by weight of talc having an average particle diameter of 2.5 µm
The resulting mixture was then melt-mixed at 220° C. and pelletized with a continuous twin-screw mixer (TEX 44SS 30BW-2V, made by Japan Steel Works, Ltd.). The resulting pellets were injection molded into flat plates (100×400×3 mm thick) at 220° C. using an injection molder, "Neomat 515/150" made by Sumitomo Heavy Industries, Ltd.

A 100 mm square was cut out from the flat plate. The surface of the specimen was treated with water or solvent as shown in Table 3 (by wiping with gauze), and then by air-dried. The specimen was coated by spraying one-solution type urethane paint (Flexthane 101, trade name of Nippon Bee Chemical Co., Ltd.) and then baked at 120° C. for 40 minutes. The coated specimen was tested for the evaluation of the initial adhesion. The results are shown in Table 3.

TABLE 3

| Treatment | Paint | Initial Adhesion (%) |
|---|---|---|
| Water | Flexthane 101 | 98 |
| Isopropyl alcohol | Flexthane 101 | 92 |
| Cyclohexane | Flexthane 101 | 98 |
| Kerosene | Flexthane 101 | 98 |

EXAMPLES 7–16

Each of the components A to D given in Tables 4–7 were blended with a Henschel mixer and then melt-kneaded with a 44 mm-twin screws-extruder at 220° C. to form pellets. Using these pellets, test pieces and plates were molded by injection molding under the conditions A and B shown in Table 8 and then subjected to the evaluation testings. The results are given in Tables 9–12.

The evaluation of the specimens were conducted in the following methods:
(1) Melt Flow Rate (MFR)
Melt flow rates of specimens were determined according to the method of JIS K6758. The measurements were conducted at a temperature of 230° C. unless otherwise indicated. The applied load was 2.16 Kg.
(2) Tensile Strength (TS)
Tensile strengths of specimens were determined according to ASTM D638. Sample plates of 3.2 mm in thickness were produced by injection molding and their tensile strengths at yield points were measured. The measurements were conducted at a temperature of 23° C. unless otherwise indicated.
(3) Flexural Test (FT)
Flexural test was conducted according to the method of JIS K 7203. Sample plates of 6.4 mm in thickness were formed by injection molding. Their flexural modulus (FM) and flexural strength (FS) were measured at a span length of 100 mm with a loading rate of 2.0 mm/min. The measurements were conducted at a temperature of 23° C. unless otherwise indicated. When the measurements were conducted at a temperature other than 23° C., the samples were kept in a temperature bath maintained to a predetermined temperature for 30 minutes before the measurements.
(4) Izod Impact Strength (IIS)
Izod impact strength was determined according to the method of JIS K7110. The impact strength was measured with the notched specimens of 6.4 mm in thickness prepared by injection molding. The measurements were conducted at a temperature of 23° C. unless otherwise indicated. When the measurements were conducted at a temperature other than 23° C., the specimens were kept in a temperature bath maintained to a predetermined temperature for 2 hours before the measurements.
(5) Heat Deformation Temperature (HDT)

Heat Deformation Temperature was determined according to JIS K7207 with a fiber stress of 4.6 Kg/cm$^2$.

(6) Appearance (AP)

The flow marks and weld marks formed on the surface of the molded plates (100 mm in width, 400 mm in length, 3 mm in thickness) prepared by injecting the resin composition through a single side gate at the shorter side and double side gates formed at each of the shorter sides, respectively, were observed with the unaided eyes. The results are given in the Tables 10 and 11 in which INSG represents that the flow or weld marks are insignificant and SG represents significant flow or weld marks.

(7) Paintability (PT)

Plates were molded in the same manner as in the above testing (6). One day thereafter, the plates were air-blown. Commercially available primer, (RB 115, manufactured by Nippon Bee Chemical Co. Ltd.) was spread onto the plates to the thickness of 5 to 10μ with a spray gun and the primer-sprayed plate was baked at 90° C. for 30 minutes in an oven. As the second coating, commercially available two solutions type-urethane paint (R 255, manufactured by Nippon Bee Chemical Co. Ltd. metallic paint) was spread onto the baked plates to the thickness of 30 to 35μ, and, 10 minutes thereafter, Clear (R266, manufactured by Nippon Bee Chemical Co. Ltd.) was spread to the thickness of 35 to 40μ. After having been baked at 90° C. for 30 minutes in an oven, the resulting plates were allowed to stand at a room temperature for 1 day and then subjected to the test of initial adhesion of the paint-coating and gasohol-resistance test.

(8) The Initial Adhesion of Paint-Coating (IA)

One hundred 1 mm-squares (10 in longitudinal direction and 10 in lateral) were formed on the surface of the paint-coating of the specimen with a razor blade, a plastic adhesive tape (Nichiban CO., Ltd. Cellophane) of 24 mm in width was tightly attached on the specimen to cover all the squares and then quickly lifted up to 90 degree to uncover them. The percentage of the squares remaining on the specimen was then determined.

(9) Gasohol-Resistance (GRS) Test

A sample plate (25 mm in width and 75 mm in length) was cut out from the paint-coated specimen and immersed in gasohol (gasoline/ethanol=90/10) at a room temperature and the time when the paint-coating started to separate was measured.

TABLE 4

Composition of crystalline ethylene-propylene block copolymer A

| | Crystalline polypropylene units | | Ethylene propylene random copolymer units | | |
|---|---|---|---|---|---|
| No. | [η]p | Q | Xylene-soluble portion (w %) | Content in A (w %) | E/P (W %) |
| PP-1 | 1.02 | 3.5 | 0.9 | 12 | 28/72 |
| PP-2 | 0.70 | 3.4 | 0.9 | 11.5 | 30/70 |
| PP-3 | 1.25 | 7.1 | 1.3 | 16 | 28/72 |
| PP-4 | 0.98 | 3.5 | 2.1 | 16 | 38/62 |
| PP-5 | 1.20 | 3.6 | 0.9 | 1 | 42/58 |
| PP-6 | 1.11 | 3.7 | 1.0 | 25 | 38/62 |
| PP-7 | 1.15 | 3.6 | 1.0 | 17 | 70/30 |
| PP-8 | 2.31 | 3.7 | 1.1 | 12 | 30/70 |

E/P: Ethylene/propylene

TABLE 5

Ethylene-propylene random copolymer B

| No. | ML$_{1+4}$ 100° C. | Amount of propylene | Iodine value | Catalyst |
|---|---|---|---|---|
| EPR-1 | 45 | 28 | — | vanadium |
| EPR-2 | 30 | 45 | — | vanadium |
| EPR-3 | 30 | 30 | 18 (ENB) | vanadium |
| EPR-4 | 77 | 45 | 10 (ENB) | vanadium |
| EPR-5 | 30 | 68 | — | titanium |
| EPR-6 | 120 | 30 | 1 (ENB) | vanadium |
| EPR-7 | 55 | 15 | — | vanadium |

TABLE 6

Hydroxyl group-containing polypropylene oligomer C

| Trade name | Molecular weight (MW) | Hydroxyl value | Specific gravity |
|---|---|---|---|
| Youmex 1201H | 12000 | 21.5 | 0.95 |
| 1201 | 4000 | 50 | 0.95 |

TABLE 7

Inorganic fillers

| Filler | Average particle size (μm) |
|---|---|
| Talc-A | 2.2 |
| Talc-B | 4.1 |
| calcium carbonate | 1.9 |
| barium sulfate | 0.8 |
| wollastonite | 8.2 |

TABLE 8

The molding conditions of the preparations of specimens

| | Molding conditions | |
|---|---|---|
| | A | B |
| Molding device | Toshiba IS150E | Neomat 515/150 |
| Die | test pieces | plates 100 × 400 × 3 mm 1 or 2 side gates |
| | Tensile strength Flexural Test Izod Impact Strength | |
| Temperature | 220° C. | 220° C. |
| Initial pressure and time | 500 Kg/cm$^2$, 5 sec. | 700 Kg/cm$^2$, 5 sec. |
| Secondary pressure and time | 300 Kg/cm$^2$, 5 sec. | 500 Kg/cm$^2$, 5 sec. |
| Cooling time | 30 sec | 30 sec |
| Die temperature | 50° C. | 50° C. |
| Screw rotation speed | 87 rpm | 80 rpm |

TABLE 9

Compositions

| Example No. | A | (WP) | B | (WP) | C | (WP) | D | (WP) |
|---|---|---|---|---|---|---|---|---|
| Example 7 | PP-1 | 60 | EPR-1 | 30 | Youmex 1201H | 5 | talc-A | 5 |
| Comparative example 9 | PP-2 | 60 | EPR- | 30 | 1201H | 5 | talc-A | 5 |
| Comparative example 10 | PP-3 | 60 | EPR-1 | 30 | 1201H | 5 | talc-A | 5 |
| Comparative example 11 | PP-4 | 60 | EPR- | 30 | 1201H | 5 | talc-A | 5 |
| Comparative example 12 | PP-5 | 60 | EPR- | 30 | 1201H | 5 | talc-A | 5 |
| Comparative example 13 | PP-6 | 60 | EPR- | 30 | 1201H | 5 | talc-A | 5 |
| Comparative example 14 | PP-7 | 60 | EPR- | 30 | 1201H | 5 | talc-A | 5 |
| Comparative example 15 | PP-8 | 60 | EPR- | 30 | 1201H | 5 | talc-A | 5 |
| Comparative example 16 | PP-1 | 90 | — | — | 1201H | 5 | talc-A | 5 |
| Comparative example 17 | PP-1 | 30 | EPR-1 | 60 | 1201H | 5 | talc-A | 5 |
| Comparative example 18 | PP-1 | 65 | EPR-1 | 30 | — | | talc-A | 5 |
| Comparative example 19 | PP-1 | 45 | EPR-1 | 30 | 1201H | 20 | talc-A | 5 |
| Comparative example 20 | PP-1 | 65 | EPR-1 | 30 | 1201H | 5 | — | — |
| Comparative example 21 | PP-1 | 25 | EPR-1 | 30 | 1201H | 20 | talc-A | 40 |

TABLE 10

| Example No. | MFR (g/10 min) | TS (MPa) | TL (%) | FM (MPa) | FS (MPa) |
|---|---|---|---|---|---|
| Example 7 | 15 | 20.0 | >500 | 1170 | 22.1 |
| Comparative example 9 | 34 | 21.6 | 160 | 1290 | 23.5 |
| Comparative example 10 | 9.8 | 19.1 | 110 | 1030 | 20.6 |
| Comparative example 11 | 13 | 18.6 | >500 | 880 | 19.6 |
| Comparative example 12 | 10.5 | 23.0 | 400 | 1390 | 25.0 |
| Comparative example 13 | 12 | 18.6 | >500 | 880 | 20.1 |
| Comparative example 14 | 11 | 20.6 | >500 | 1170 | 23.1 |
| Comparative example 15 | 1.3 | 19.6 | >500 | 1030 | 21.0 |
| Comparative example 16 | 28 | 29.9 | 80 | 1780 | 42.7 |
| Comparative example 17 | 0.5 | 5.9 | >500 | 206 | 6.9 |
| Comparative example 18 | 14 | 20.6 | >500 | 1200 | 22.6 |
| Comparative example 19 | 17 | 18.6 | 350 | 1080 | 19.6 |
| Comparative example 20 | 16 | 18.1 | >500 | 840 | 19.1 |
| Comparative example 21 | 4.3 | 16.7 | 125 | 2600 | 20.6 |

TABLE 10-1

| Example No. | IIS 23° C. | (J/M) −30° C. | HDT (°C.) | flow mark | weld mark | IA (%) | GRS (min) |
|---|---|---|---|---|---|---|---|
| Example 7 | NB | 93 | 107 | INSG | INSG | 100 | >120 |
| Comparative example 9 | 255 | 52 | 110 | INSG | INSG | 100 | >120 |
| Comparative example 10 | NB | 140 | 105 | INSG | SG | 95 | 70 |
| Comparative example 11 | NB | 83 | 95 | INSG | INSG | 100 | >120 |
| Comparative example 12 | 186 | 48 | 112 | INSG | SG | 85 | 60 |
| Comparative example 13 | NB | 265 | 98 | SG | INSG | 100 | >120 |
| Comparative example 14 | 285 | 50 | 104 | SG | INSG | 88 | 70 |

TABLE 10-1-continued

| Example No. | IIS 23° C. | (J/M) −30° C. | HDT (°C.) | flow mark | weld mark | IA (%) | GRS (min) |
|---|---|---|---|---|---|---|---|
| Comparative example 15 | NB | NB | 103 | SG | SG | 100 | 60 |
| Comparative example 16 | 62 | 32 | 138 | INSG | INSG | 25 | <30 |
| Comparative example 17 | NB | NB | UM | SG | SG | 75 | <30 |
| Comparative example 18 | NB | 89 | 108 | INSG | INSG | 80 | <30 |
| Comparative example 19 | 265 | 50 | 101 | SG | SG | 85 | >120 |
| Comparative example 20 | NB | 88 | 98 | INSG | INSG | 100 | 55 |
| Comparative example 21 | 108 | 34 | 109 | SG | SG | 75 | 50 |

NB: not broken
UM: impossible to determine
INSG: insignificant
SG: significant

TABLE 11

| | Compositions | | | | | | | |
|---|---|---|---|---|---|---|---|---|
| | Components (weight parts) | | | | | | | |
| Example No. | A | (WP) | B | (WP) | C | (WP) | D | (WP) |
| Example 8 | PP-1 | 60 | EPR-2 | 30 | Youmex 1201H | 5 | talc-A | 5 |
| Example 9 | PP-1 | 60 | EPR-3 | 30 | 1201H | 5 | talc-A | 5 |
| Example 10 | PP-1 | 60 | EPR-4 | 30 | 1201H | 5 | talc-A | 5 |
| Example 11 | PP-1 | 60 | EPR-5 | 30 | 1201H | 5 | talc-A | 5 |
| Comparative example 22 | PP-1 | 60 | EPR-6 | 30 | 1201H | 5 | talc-A | 5 |
| Comparative example 23 | PP-1 | 60 | EPR-7 | 30 | 1201H | 5 | talc-A | 5 |
| Example 12 | PP-1 | 60 | EPR-1 | 30 | 1210 | 5 | talc-A | 5 |
| Example 13 | PP-1 | 60 | EPR-1 | 30 | 1201H | 5 | talc-B | 5 |
| Example 14 | PP-1 | 60 | EPR-1 | 30 | 1201H | 5 | calcium carbonate | 5 |
| Example 15 | PP-1 | 60 | EPR-1 | 30 | 1201H | 5 | barium sulfate | 5 |
| Example 16 | PP-1 | 60 | EPR-1 | 30 | 1201H | 5 | wollastonite | 5 |

TABLE 12

| Example No. | MFR (g/10 min) | TS (MPa) | TL (%) | FM (MPa) | FS (MPa) |
|---|---|---|---|---|---|
| Example 8 | 11 | 15.2 | >500 | 980 | 17.2 |
| Example 9 | 10 | 18.6 | >500 | 1030 | 20.1 |
| Example 10 | 12 | 17.7 | >500 | 980 | 18.6 |
| Example 11 | 9 | 17.7 | >500 | 1030 | 20.6 |
| Comparative example 22 | 5.3 | 18.6 | >500 | 1060 | 20.1 |
| Comparative Example 23 | 13 | 22.1 | 180 | 1300 | 24.0 |
| Example 12 | 16 | 19.5 | >500 | 1140 | 21.5 |
| Example 13 | 11 | 19.6 | >500 | 1080 | 21.6 |
| Example 14 | 14 | 17.9 | >500 | 960 | 20.1 |
| Example 15 | 17 | 18.6 | >500 | 950 | 19.6 |
| Example 16 | 16 | 19.1 | >500 | 1000 | 20.6 |

TABLE 12-1

| Example No. | IIS 23° C. | (J/M) −30° C. | HDT (0C) | flow mark | weld mark | IA (%) | GRS (min) |
|---|---|---|---|---|---|---|---|
| Example 8 | NB | 128 | 100 | INSG | INSG | 100 | >120 |
| Example 9 | NB | 98 | 105 | INSG | INSG | 100 | >120 |
| Example 10 | NB | 72 | 100 | INSG | INSG | 100 | >120 |
| Example 11 | NB | 118 | 104 | INSG | INSG | 100 | >120 |
| Comparative example 22 | NB | 123 | 107 | SG | INSG | 75 | <30 |
| Comparative example 23 | 284 | 53 | 113 | INSG | INSG | 83 | 40 |
| Example 12 | NB | 98 | 106 | INSG | INSG | 100 | >120 |
| Example 13 | NB | 78 | 105 | INSG | INSG | 100 | >120 |
| Example 14 | NB | 226 | 100 | INSG | INSG | 100 | >120 |
| Example 15 | NB | 186 | 100 | INSG | INSG | 100 | >120 |
| Example 16 | NB | 137 | 102 | INSG | INSG | 100 | >120 |

NB: not broken
INSG: insignificant
SG: significant

What is claimed is:

1. A polypropylene composition which comprises:
   (A) 60–95 parts by weight of a crystalline polypropylene, which is a propylene-ethylene block copolymer containing ethylene-propylene random copolymer units and crystalline polypropylene homopolymer units wherein an amount of said ethylene-propylene random copolymer units is 5 to 20% by weight relative to the total weight of the propylene-ethylene block copolymer, an ethylene content in the ethylene-propylene random copolymer units is 20 to 60% by weight, and the crystalline polypropylene homopolymer units have an intrinsic viscosity measured with tetralin solution at 135° C. of 0.8 to 2.0 dl/g, a Q value measured by GPC of 3.0 to 5.0 and a content of xylene-soluble portion at 20° C. of not more than 1.5% by weight,
   (B) 5–40 parts by weight of an ethylene-propylene random copolymer rubber containing 10–70 wt % of propylene and having a Mooney viscosity, $ML_{1+4}$ 100° C., of 10–100, the mixture of (A) and (b) being 100 parts by weight
   (C) 1–15 parts by weight, per 100 parts by weight of the mixture of said crystalline polypropylene and ethylene-propylene copolymer rubber, of a hydroxyl group-containing propylene oligomer having a number-average molecular weight of 2,000–20,000 and a hydroxyl value of 10–6 and
   (D) an inorganic filler in an amount of up to 40 parts by weight per 100 parts by weight of the mixture of said crystalline polypropylene and ethylene-propylene copolymer rubber.

2. The polypropylene composition according to claim 1, which further comprises a suitable amount of an additive or auxiliary.

3. The polypropylene composition according to claim 1, wherein said inorganic filler is a member selected from the group consisting of talc, mica, wollastonite, calcium carbonate, barium sulfate, magnesium carbonate, clay, alumina, silica, calcium sulfate, carbon fiber, glass fiber, metal fiber, silica sand, silicastone, carbon black, titanium oxide, magnesium hydroxide, asbestos, zeolite, molybdenum, diatomaceous earth, sericite, Shirasu, calcium hydroxide, potassium sulfite, sodium sulfate, bentonite and graphite.

4. The polypropylene composition according to claim 3, wherein said inorganic filler is talc with an average particle diameter not larger than 3 μm.

* * * * *